(12) United States Patent
Behrens et al.

(10) Patent No.: US 10,399,683 B2
(45) Date of Patent: Sep. 3, 2019

(54) THERMAL MANAGEMENT SYSTEMS AND METHODS

(71) Applicant: THE BOEING COMPANY, Chicago, IL (US)

(72) Inventors: William Webster Behrens, St. Louis, MO (US); Andrew Richard Tucker, Glendale, MO (US)

(73) Assignee: The Boeing Company, Chicago, IL (US)

( * ) Notice: Subject to any disclaimer, the term of this patent is extended or adjusted under 35 U.S.C. 154(b) by 268 days.

(21) Appl. No.: 15/044,523

(22) Filed: Feb. 16, 2016

(65) Prior Publication Data

US 2017/0233082 A1    Aug. 17, 2017

(51) Int. Cl.
*B64D 13/06* (2006.01)
*B64D 37/34* (2006.01)
*F02C 6/08* (2006.01)

(52) U.S. Cl.
CPC ............. *B64D 13/06* (2013.01); *B64D 37/34* (2013.01); *B64D 2013/064* (2013.01); *B64D 2013/0618* (2013.01); *B64D 2013/0648* (2013.01); *B64D 2013/0674* (2013.01); *F02C 6/08* (2013.01); *Y02T 50/56* (2013.01)

(58) Field of Classification Search
CPC .. B64D 13/06; B64D 37/34; B64D 2013/064; B64D 2013/0648; B64D 2013/0674; F02C 6/08
See application file for complete search history.

(56) References Cited

U.S. PATENT DOCUMENTS

| 3,158,197 | A | * | 11/1964 | Blezard | B64D 13/00 165/104.31 |
| 4,018,060 | A | * | 4/1977 | Kinsell | B64D 13/06 123/563 |
| 5,121,610 | A | * | 6/1992 | Atkinson | B60H 1/00007 62/151 |
| 5,442,905 | A | * | 8/1995 | Claeys | B64D 13/06 454/71 |

(Continued)

FOREIGN PATENT DOCUMENTS

| CN | 1138685 | | 12/1996 |
| CN | 1138685 | A * | 12/1996 |

(Continued)

OTHER PUBLICATIONS

Ram-Air Cooling Systems for Aircraft Generators by Richard M. Moroney (Sep. 1957)—Retrieved Jun. 2017.*

(Continued)

*Primary Examiner* — Cassey D Bauer
*Assistant Examiner* — Jenna M Hopkins
(74) *Attorney, Agent, or Firm* — Philip S. Hof; The Small Patent Group, LLC (57) ABSTRACT

A thermal management system includes at least one vapor control system (VCS) that is configured to cool portions of the vehicle. The VCS circulates a fluid therethrough to cool the portions of the vehicle through heat exchange. At least one reverse air cycle machine (RACM) couples to VCS through a first heat exchanger. The RACM is configured to receive ram air. The RACM expands the ram air. Heat from the fluid circulating through the VCS is transferred to the expanded ram air through the first heat exchanger.

20 Claims, 6 Drawing Sheets

(56) References Cited

U.S. PATENT DOCUMENTS

| | | | | |
|---|---|---|---|---|
| 5,956,960 A * | 9/1999 | Niggeman | ............ | B64D 13/06 60/785 |
| 6,526,775 B1 * | 3/2003 | Asfia | ............ | B64D 13/06 62/401 |
| 6,681,592 B1 * | 1/2004 | Lents | ............ | B64D 13/06 62/401 |
| 6,845,630 B2 * | 1/2005 | Bruno | ............ | B64D 13/06 454/71 |
| 6,928,832 B2 * | 8/2005 | Lents | ............ | B64D 13/06 62/401 |
| 7,437,524 B2 * | 10/2008 | Narayan | ............ | G06F 11/073 711/161 |
| 7,467,524 B2 * | 12/2008 | Brutscher | ............ | B64D 13/06 62/401 |
| 7,578,136 B2 * | 8/2009 | Derouineau | ............ | B64D 13/02 62/172 |
| 7,849,702 B2 | 12/2010 | Parikh | | |
| 8,042,343 B2 * | 10/2011 | Jarlestal | ............ | B64D 13/00 244/118.5 |
| 8,042,354 B1 * | 10/2011 | Dziorny | ............ | B64D 13/06 62/172 |
| 8,272,930 B2 * | 9/2012 | Klimpel | ............ | B64D 13/02 454/71 |
| 8,707,721 B2 * | 4/2014 | Scherer | ............ | B64D 13/00 62/239 |
| 8,863,544 B2 * | 10/2014 | Lee | ............ | H05K 7/207 62/259.2 |
| 8,967,528 B2 * | 3/2015 | Mackin | ............ | F02C 6/08 244/53 R |
| 9,114,881 B2 | 8/2015 | Mar | | |
| 9,254,920 B2 * | 2/2016 | Zhou | ............ | F02C 6/08 |
| 2002/0162915 A1 * | 11/2002 | Mitani | ............ | B64D 13/06 244/118.5 |
| 2004/0155147 A1 * | 8/2004 | Munoz | ............ | B64D 13/06 244/118.5 |
| 2004/0172963 A1 * | 9/2004 | Axe | ............ | B64D 13/06 62/401 |
| 2009/0002948 A1 * | 1/2009 | Jarlestal | ............ | B64D 13/00 361/701 |
| 2010/0170262 A1 * | 7/2010 | Kaslusky | ............ | B64D 13/00 60/778 |
| 2013/0086927 A1 * | 4/2013 | Mills | ............ | F25B 27/00 62/56 |
| 2013/0118194 A1 * | 5/2013 | Mar | ............ | B64D 13/08 62/115 |
| 2013/0187007 A1 * | 7/2013 | Mackin | ............ | F02C 6/08 244/134 R |
| 2014/0345305 A1 * | 11/2014 | Sieme | ............ | B64D 13/08 62/79 |
| 2015/0107261 A1 * | 4/2015 | Moes | ............ | B64D 13/06 60/783 |
| 2017/0057641 A1 * | 3/2017 | Koemer | ............ | B64D 13/06 |
| 2017/0174348 A1 * | 6/2017 | Shea | ............ | B64D 13/02 |
| 2017/0217592 A1 * | 8/2017 | Hinderliter | ............ | B64D 13/08 |

FOREIGN PATENT DOCUMENTS

| | | | | |
|---|---|---|---|---|
| EP | | 2966391 A1 * | 1/2016 | ............ F28F 13/12 |
| WO | WO 2012065713 A3 * | | 8/2012 | ............ B64D 13/00 |

OTHER PUBLICATIONS

"A Ram Air Driven Air Cycle Cooling System for Avionics Pods" by Richard M. Grabow, Todd W. Kreter, and Gil E Limberg, Jul. 1986—Retrieved Jun. 2017.*

CN 1138685 A—Machine Translation English—Retrieved Jun. 2017.*

WO 2012065713 A3—Machine Translation English—Retrieved Jun. 2017.*

A Ram Air Driven Air Cycle Cooling System for Avionics Pods—Grabow (1968).*

A Ram Air Driven Air Cycle Cooling System for Avionics Pods—Grabow(1986).*

Aerodynamic Evaluation of Two-Stage Axial Flow Turbine Designed for Brayton-Cycle Space Power System—Kofskey (1968).*

Single- or Two-Stage Compression—Jekel (2008).*

* cited by examiner

THERMAL MANAGEMENT SYSTEMS AND METHODS

FIELD OF THE DISCLOSURE

Embodiments of the present disclosure generally relate to thermal management systems and methods, and, more particularly, to thermal management systems and methods that are configured to efficiently condition portions of an aircraft, such as an internal cabin, electronic components, and the like.

BACKGROUND OF THE DISCLOSURE

Various aircraft draw air from turbine compression systems of one or more engines in order to maintain cabin pressure and to power auxiliary systems. The drawn air from the engine(s) is bleed air. In general, bleed air is compressed air that is drawn from a compressor stage of an engine, which is typically upstream from fuel-burning portions of the engine.

Known aircraft include systems that route bleed air through air conditioning systems to cool sub-systems within the aircraft, as well as internal chambers, such as the cockpit and the cabin. However, utilizing bleed air in relation to air conditioning within an aircraft decreases engine efficiency and aircraft range because energy is expended compressing the air, which is subsequently decompressed and re-cooled when used for air conditioning.

Air cycle machines have been used to provide air conditioning for various commercial and military aircraft. A typical air cycle machine utilizes high temperature, high pressure bleed air extracted from the compressor of a main engine, for example. As noted, however, extraction of bleed air expends energy, which is generated through fuel consumption. In short, a portion of the fuel is used to extract the bleed air, which, in turn, reduces the operating range of an aircraft. Further, aircraft range is typically further reduced because a typical air cycle machine has a low coefficient of performance (COP), which may be further reduced as the speed of the aircraft increases.

SUMMARY OF THE DISCLOSURE

A need exists for a system and method of efficiently and conditioning an internal chamber and/or components of an aircraft.

With that need in mind, certain embodiments of the present disclosure provide a thermal management system that is configured to cool portions of a vehicle. The thermal management system may include at least one vapor control system (VCS) that is configured to cool the portions of the vehicle. The VCS circulates a fluid therethrough to cool the portions of the vehicle through heat exchange. At least one reverse air cycle machine (RACM) couples to the VCS through a first heat exchanger. The RACM is configured to receive ram air. The RACM expands the ram air. Heat from the fluid circulating through the at least one VCS is transferred to the expanded ram air through the first heat exchanger. The thermal management system may refrain from utilizing bleed air from an engine of the vehicle.

The RACM may include a turbine. The ram air may at least partially power the turbine. The RACM may include a compressor that compresses the ram air after the heat from the fluid is transferred to the ram air. The ram air is exhausted from the vehicle after the compressor compresses the ram air.

The thermal management system may also include a second heat exchanger that couples the VCS to a ram air conduit that connects to a ram air inlet. Heat from the fluid circulating through the VCS is also transferred to the ram air flowing through the ram air conduit through the second heat exchanger.

The thermal management system may also include a third heat exchanger that couples the VCS to a fuel line that connects a fuel tank to an engine of the vehicle. Heat from the fluid circulating through the VCS is also transferred to fuel flowing through the fuel line through the third heat exchanger.

In at least one embodiment, the at least two parallel VCS may be used. In at least one embodiment, the at least two parallel RACMs may be used.

The RACM may include one or more first valves configured to control a flow of ram air through a heat exchange circuit that includes the first exchanger. The VCS may include one or more second valves configured to control a flow of the fluid through the VCS. The thermal management system may also include a control unit operatively coupled to the first valve(s) and the second valve(s). The control unit selectively controls the one or first valve(s) and the second valve(s).

Certain embodiments of the present disclosure provide a thermal management method of cooling portions of a vehicle. The thermal management method may include cooling the portions of the vehicle with at least one vapor control system (VCS). The cooling operation may include circulating a fluid the VCS to cool the portions of the vehicle through heat exchange. The method may also include receiving ram air with at least one reverse air cycle machine (RACM) that couples to the VCS through a first heat exchanger, expanding and cooling the ram air with the RACM, and transferring heat from the fluid circulating through the VCS to the ram air that is expanded through the first heat exchanger.

Certain embodiments of the present disclosure provide an aircraft that may include a fuselage defining one or more internal compartments, one or more electronic components, wings extending from the fuselage, an empennage extending from the fuselage, one or more engines, a fuel line that connects a fuel tank to an engine of the vehicle, and a thermal management system that cools portions of the aircraft without using bleed air from the one or more engines.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide systems and methods of efficiently cooling aircraft systems (for example, avionics systems), internal chambers, and the like. As such, embodiments of the present disclosure increase aircraft range (such as by consuming less fuel than known systems and methods). It has been found that embodiments of the present disclosure increase aircraft range, as compared to aircraft that utilize conventional bleed air thermal management systems, by a factor of four or more.

Certain embodiments of the present disclosure provide a thermal management system for an aircraft. The thermal management system may be used to cool aircraft systems and internal chambers, such as a cabin and cockpit. The thermal management system may include a reverse air cycle machine (RACM) coupled to a vapor control system (VCS). Heat energy is transferred between fluid flowing through the VCS and airflow from the RACM.

In at least one embodiment, ram air is routed to the RACM. The ram air may power the RACM, such as by turning a turbine of the RACM. The ram air flowing through the turbine is cooled by expansion. The cooled ram air is then passed through a heat exchanger that couples the VCS to the RACM, where the cooled ram air absorbs heat energy from fluid flowing through the VCS. After passing through the heat exchanger, the ram air is routed back to a compressor of the RACM, and then expelled from the aircraft.

Certain embodiments of the present disclosure provide a thermal management system that is used to cool aircraft systems and compartments. The thermal management system may include a ram air inlet, and a first conduit that delivers ram air from the inlet to a turbine of a RACM, which may be powered, at least in part, by ram air flowing through the turbine. A second conduit delivers the ram air, which has been cooled via expansion, from the turbine of the RACM to a heat exchanger coupled with a two stage VCS. A third conduit delivers the ram air from the heat exchanger to a compressor of the RACM. Ram air from the compressor of the RACM is expelled from the aircraft through an outlet. One or more valves may be used to control the volume of air flow through the heat exchanger and through the system.

The thermal management system may be bleedless, in that it does not utilize bleed air from an engine. The thermal management system combines a Vapor Cycle System (VCS) with a Reverse Air Control Machine (RACM). The VCS conditions aircraft heat loads. A subcooler may be employed in the VCS to further improve cycle performance. Two stages of refrigeration compression may be employed to increase refrigerant condensing temperature. The RACM may be used to generate a cold heat sink for the VCS by expanding ram air. After absorbing waste heat, the expanded ram air may be compressed and dumped overboard. By lowering the temperature of the ram air through expansion, the RACM reduces the amount of ram air used, which reduces ram drag and improves vehicle performance. The thermal management system may also utilize fuel and unexpanded ram air as additional heat sinks. Pressurized ram air may be used to drive the RACM, at least in part. In at least one embodiment, the RACM may also include an electric motor that assists the RACM in expanding and compressing the ram air.

To maintain high efficiency, parallel vapor cycle compression and/or multiple RACM units may be used. In addition to improving efficiency, parallel units reduce the size of turbo machinery of the aircraft.

Figure 1:
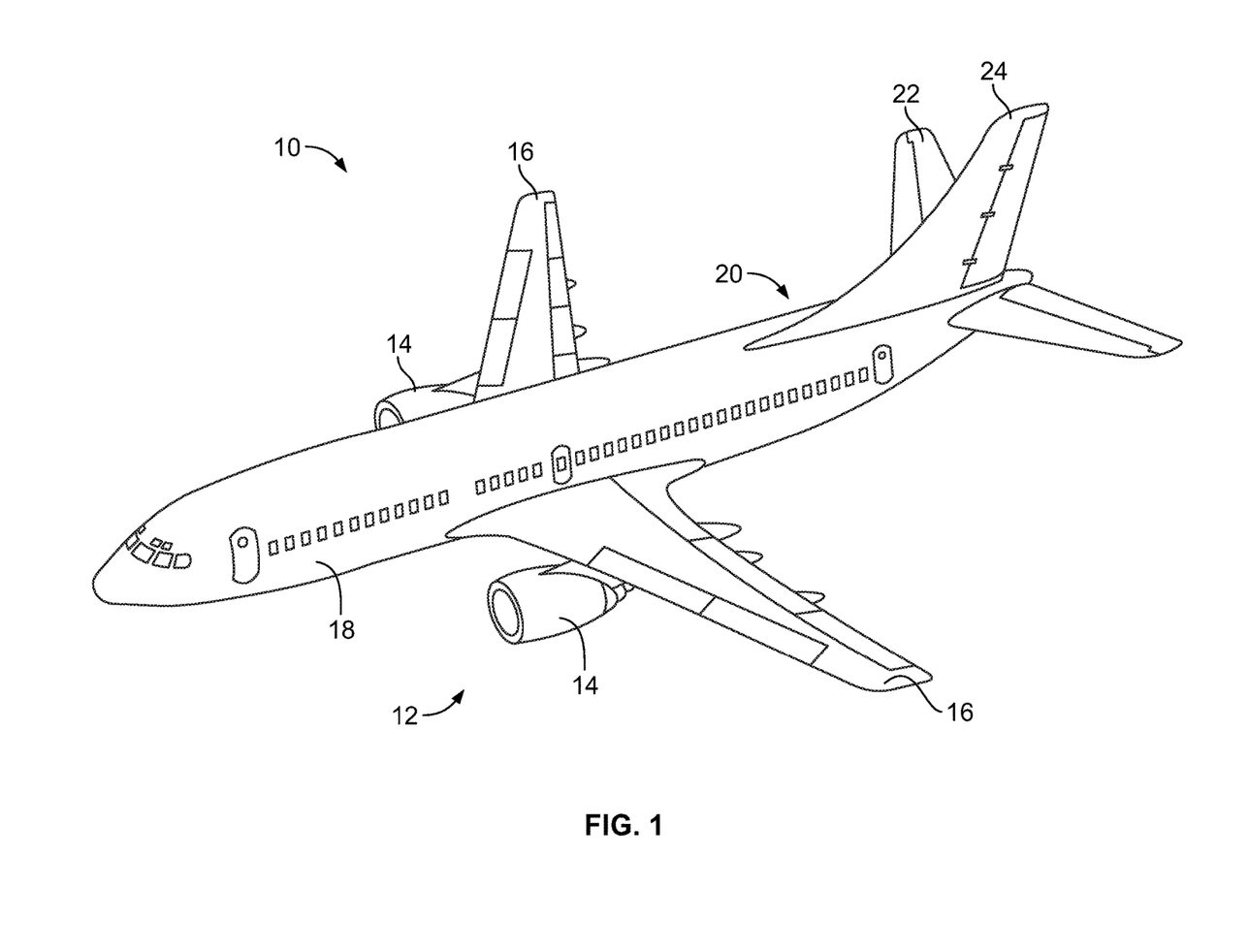
FIG. 1 illustrates a perspective top view of an aircraft, according to an embodiment of the present disclosure.

FIG. 1 illustrates a perspective top view of a vehicle, such as an aircraft 10 (or aircraft assembly), according to an embodiment of the present disclosure. The aircraft 10 may include a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin.

As explained below, the aircraft 10 may include a thermal management system that is used to cool various systems within the aircraft, as well as the internal cabin. Alternatively, instead of an aircraft, embodiments of the present disclosure may be used with various other vehicles, such as automobiles, buses, locomotives and train cars, watercraft, and the like.

Figure 2A:
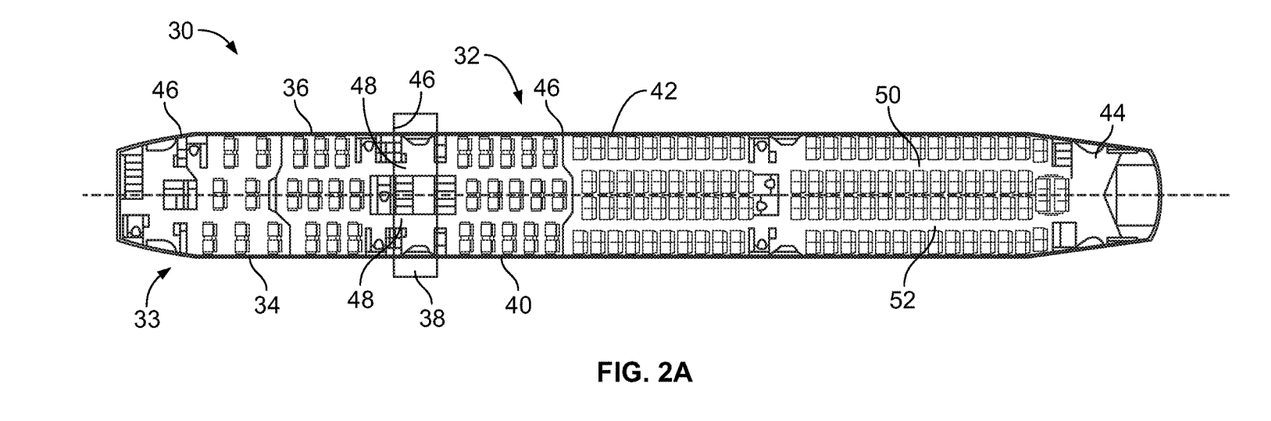
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34 (or first class suites, cabins, for example), a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
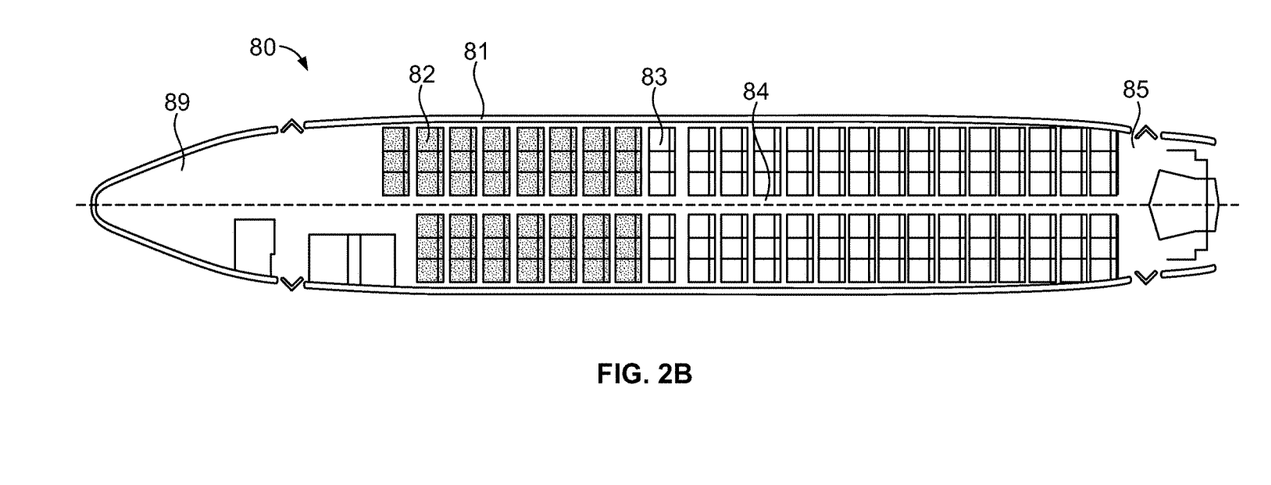
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a cockpit 89, a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
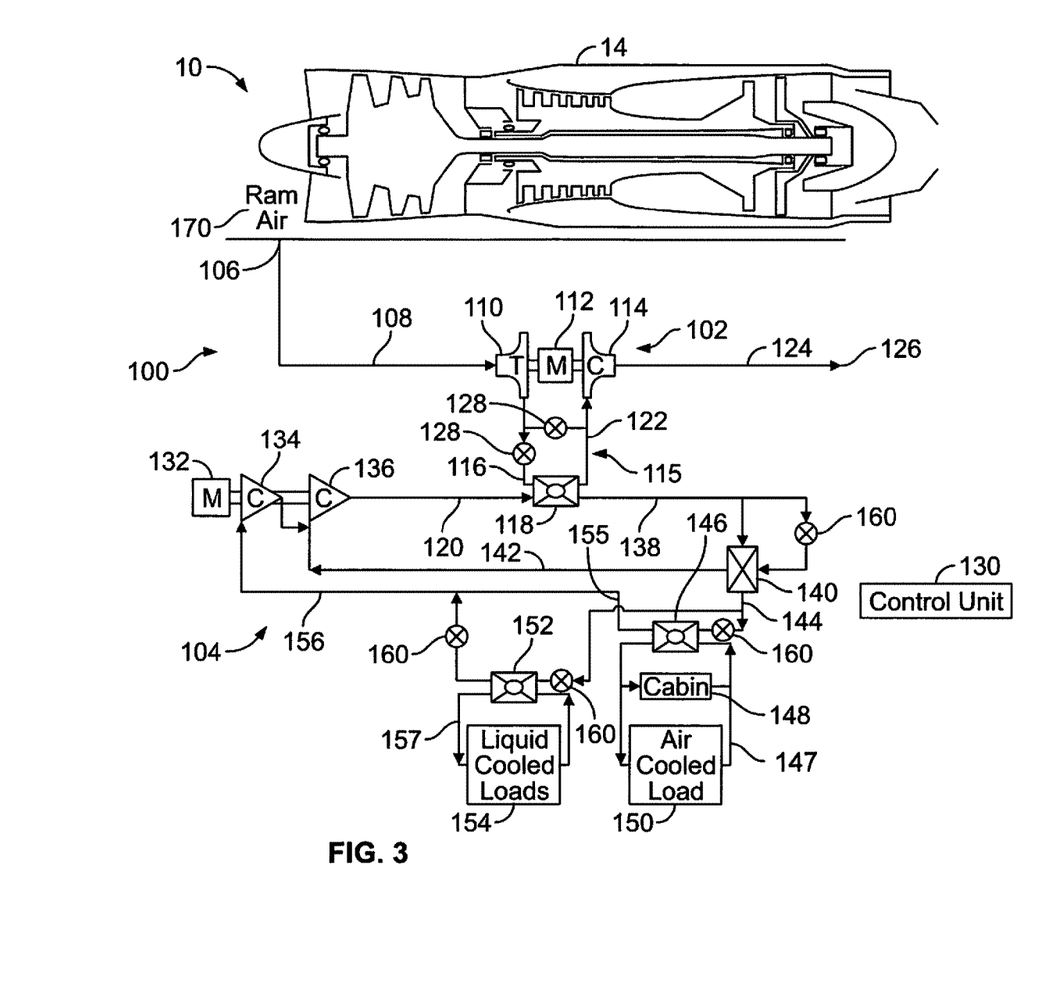
FIG. 3 illustrates a schematic view of a thermal management system of an aircraft, according to an embodiment of the present disclosure.

FIG. 3 illustrates a schematic view of a thermal management system 100 of the aircraft 10, according to an embodiment of the present disclosure. The thermal management system 100 may include a reverse air cycle machine (RACM) 102 coupled to a vapor control system (VCS) 104.

A ram air inlet 106 is formed through a portion of the aircraft 10. For example, the ram air inlet 106 may be formed through a portion of the fuselage 18 (shown in FIG. 1), the wings 16 (shown in FIG. 1), and/or the like. Additional ram inlets 106 may be formed through the portion of the aircraft 10.

The ram air inlet 106 is coupled to the RACM 102 through an inlet conduit 108, such as a tube, pipe, plenum, or other such structure. The RACM 102 includes a turbine 110 coupled to a motor 112. The RACM 102 also includes a compressor 114. The RACM may provide a refrigeration unit for an environmental control system (ECS), such as the thermal management system 100.

The RACM 102 may include or otherwise be coupled to a heat transfer circuit 115. The heat transfer circuit 115 may include an exchange inlet conduit 116 that extends from the turbine 110 to an inlet of a heat exchanger 118 through the exchange inlet conduit 116, and an exchange inlet conduit 120 of the VCS 104 pass. The heat exchanger 118 couples the RACM 102 to the VCS 104. An exchange outlet conduit 122 extends from an outlet of the heat exchanger 118 to the compressor 114 of the RACM 114. An outlet of the compressor 114 connects to an outlet conduit 124 that connects to an air outlet 126 formed through a portion of the aircraft 10, such as a portion of the fuselage 18 (shown in FIG. 1).

One or more valves 128 may be disposed within the heat transfer conduit 115. The valves 128 may be selectively operated and controlled by a remote control unit 130. The control unit 130 operates the valves 128 to control fluid flow through the heat transfer conduit 115.

The VCS 104 may be configured to provide vapor-compression refrigeration, in which a refrigerant undergoes phase changes to condition an internal cabin and/or systems of the aircraft 10. The VCS 104 circulates the refrigerant therethrough to cool portions of the aircraft 10 through heat exchange. The refrigerant provides a fluid that circulates through the VCS 104, through various phases (for example, liquid and vapor phases), in order to cool an internal cabin and/or components of the aircraft 10.

The VCS 104 may include a motor 132 coupled to compressors 134 and 136. The compressor 136 is coupled to the exchange inlet conduit 120 that passes through the heat exchanger 118. An exchange outlet conduit 138 extends from an outlet of the heat exchanger 118 to a heat exchanger 140. A return conduit 142 extends between the heat exchanger 140 and the compressor 136. A conditioning conduit 144 extends between the heat exchanger 140 and a heat exchanger 146 that couples to a heat transfer circuit 147 that is coupled to a cabin 148 and air cooled loads 150 (for example, one or more electronic systems of the aircraft 10 that are cooled through air circulation) within the aircraft 10. The conditioning conduit 144 may also couple to a heat exchanger 152 that couples to a heat transfer circuit 157 that couples to liquid cooled loads 154 (for example, one or more electronic systems of the aircraft 10 that are cooled through liquid circulation). Return conduits 155 and 156 couple outlets of the heat exchangers 146 and 152, respectively, to the compressor 134.

As shown, one or more valves 160 may be disposed within the various conduits of the VCS 104. The valves 160 may be selectively controlled by the control unit 130 to provide a desired amount of fluid (for example, refrigerant or other such coolant) flow through the VCS 104.

In operation, ram air 170 passes into the ram air inlet 106 and into the turbine 110 through the inlet conduit 108. Ram air is airflow created by movement of the aircraft 10, as opposed to bleed air, which is generated by the engine 14. That is, as the aircraft moves, air flow is created in relation to the movement, and is forced into the inlet conduit 108. The thermal management system 100 utilizes the ram air 170, but not bleed air, in order to cool the fluid within the VCS 104, which is, in turn, used to cool internal compartments and/or components of the aircraft 10.

The ram air 170 passes into the turbine 110 and powers the turbine 110. That is, the flow of the ram air 170 through the turbine 110 causes the turbine 110 to move. The motor 112 may be used to assist movement of the turbine 110. As the ram air 170 passes through the turbine 110, the ram air 170 expands and cools. The expanded, cooled ram air 170 then passes into the heat exchanger 118.

As the ram air 170 passes through the heat exchanger 118, heat energy is transferred from the fluid within the VCS 104 passing through the exchange inlet conduit 120 to the ram air 170 through the heat exchanger 118. As such, the RACM 102 provides a heat sink in which the ram air 170 absorbs heat from the fluid flowing through the VCS 104. The ram air 170 then passes into the compressor 114 of the RACM 102, where it is compressed, and then is exhausted out of the aircraft 10 through the air outlet 126.

The fluid flowing through the VCS 104 is cooled through energy exchange with the ram air 170. The cooled fluid within the VCS 104 is used to pick up heat from the cabin 148, the air cooled load 150, and the liquid cooled loads 154 through energy exchange, thereby cooling the cabin 148, the air cooled load 150, and the liquid cooled loads.

The control unit 130 may operate to selectively control fluid flow through the thermal management system 100 through the valves 128 and 160. For example, the control unit 130 may selectively open and close the valves 128 and 160 to control a temperature of the fluids (whether gas, vapor, or liquid) through the various conduits, in order to control temperatures of the cabin 148, the air cooled load 150, and the liquid cooled loads 154.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 130 may be or include one or more processors that are configured to control operation of the thermal management system 100.

The control unit 130 is configured to execute a set of instructions that are stored in one or more storage elements (such as one or more memories), in order to process data. For example, the control unit 130 may include or be coupled to one or more memories. The storage elements may also store data or other information as desired or needed. The storage elements may be in the form of an information source or a physical memory element within a processing machine.

The set of instructions may include various commands that instruct the control unit 130 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 130. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 130 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 4:
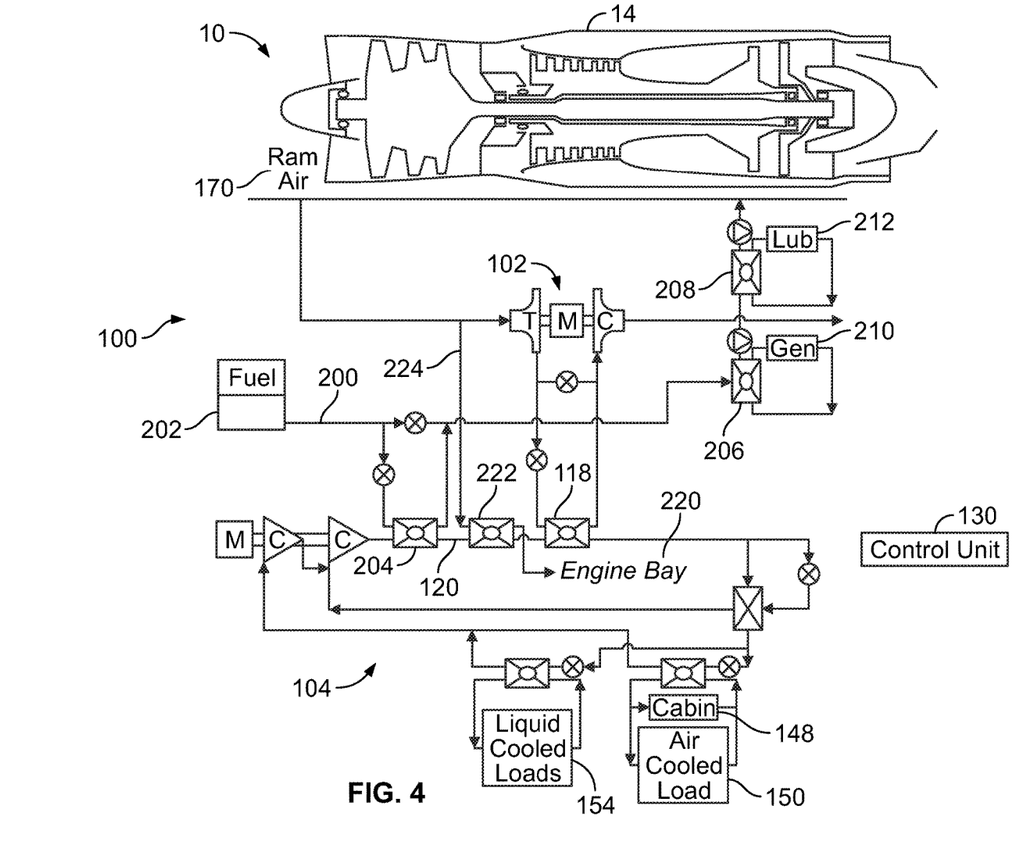
FIG. 4 illustrates a schematic view of a thermal management system, according to an embodiment of the present disclosure.

FIG. 4 illustrates a schematic view of the thermal management system 100, according to an embodiment of the present disclosure. The thermal management system 100 is similar to the embodiment shown in FIG. 4. In addition to the expanded ram air flowing through the RACM 102 being a heat sink in relation to the fluid flowing through the VCS 104, a fuel line 200 also provides an additional heat sink. The fuel line 200 provides a fuel delivery conduit between a fuel tank 202 and the engine 14. A heat exchanger 204 couples the fuel line 200 to the exchange inlet conduit 120 of the VCS 104. As such, the heat exchanger 204 transfers heat energy from the fluid within the exchange inlet conduit 120 to the fuel within the fuel line 200, thereby increasing the temperature of the fuel, and decreasing the temperature of the fluid within the exchange inlet conduit 120.

The fuel line 200 may then pass through heat exchangers 206 and 208 of an engine generator 210 and a lubrication system 212. Heat energy is transferred from the generator 210 and the lubrication system 212 to fuel within the fuel line 200 by way of the heat exchangers 206 and 208, thereby increasing the temperature of the fuel, and decreasing the temperature of the generator 210 and the lubrication system 212. The fuel is then delivered to the engine through the fuel line 200.

Alternatively, the fuel line 200 may not be coupled to the generator 210 and the lubrication system 212 through the heat exchangers 206 and 208. Instead, fuel within the fuel line 200 may receive heat energy from the VCS 104 by way of the heat exchanger 204, and then pass directly to the engine 14.

Additionally, ram air 170 (which is not expanded and cooled) that is used to ventilate an engine bay 220 may be used as an additional heat sink. A first portion of the ram air 170 may be delivered to the RACM 102, as described above. A second portion of the ram air 170 may be delivered to a heat exchanger 222 coupled to the exchange inlet conduit 120 by way of a transfer conduit 224. The ram air 170 passing through the heat exchanger 222 receives heat energy from the fluid (for example, refrigerant or other coolant) flowing through the heat exchanger 222. As such, the temperature of the ram air 170 passing through the heat exchanger 222 increases, which reduces the temperature of the fluid flowing through the exchange inlet conduit 120. The ram air 170 then passes to the engine bay 220.

Accordingly, the thermal management system 100 provides three heat sinks. First, the RACM 102 provides a heat sink that receives heat energy from the VCS 104 through the heat exchanger 118. Second, the fuel line 200 provides a heat sink that receives heat energy from the VCS 104 through the heat exchanger 204. Third, the ram air 170 provides a heat sink that receives heat energy from the VCS 104 through the heat exchanger 222. All three heat sinks absorb heat energy from the VCS 104, thereby cooling the fluid flowing through the VCS 104, which thereby efficiently cools the cabin 148 and various components of the aircraft 10, such as those that are cooled through air circulation or ventilation and those that are cooled through liquid circulation.

Figure 5:
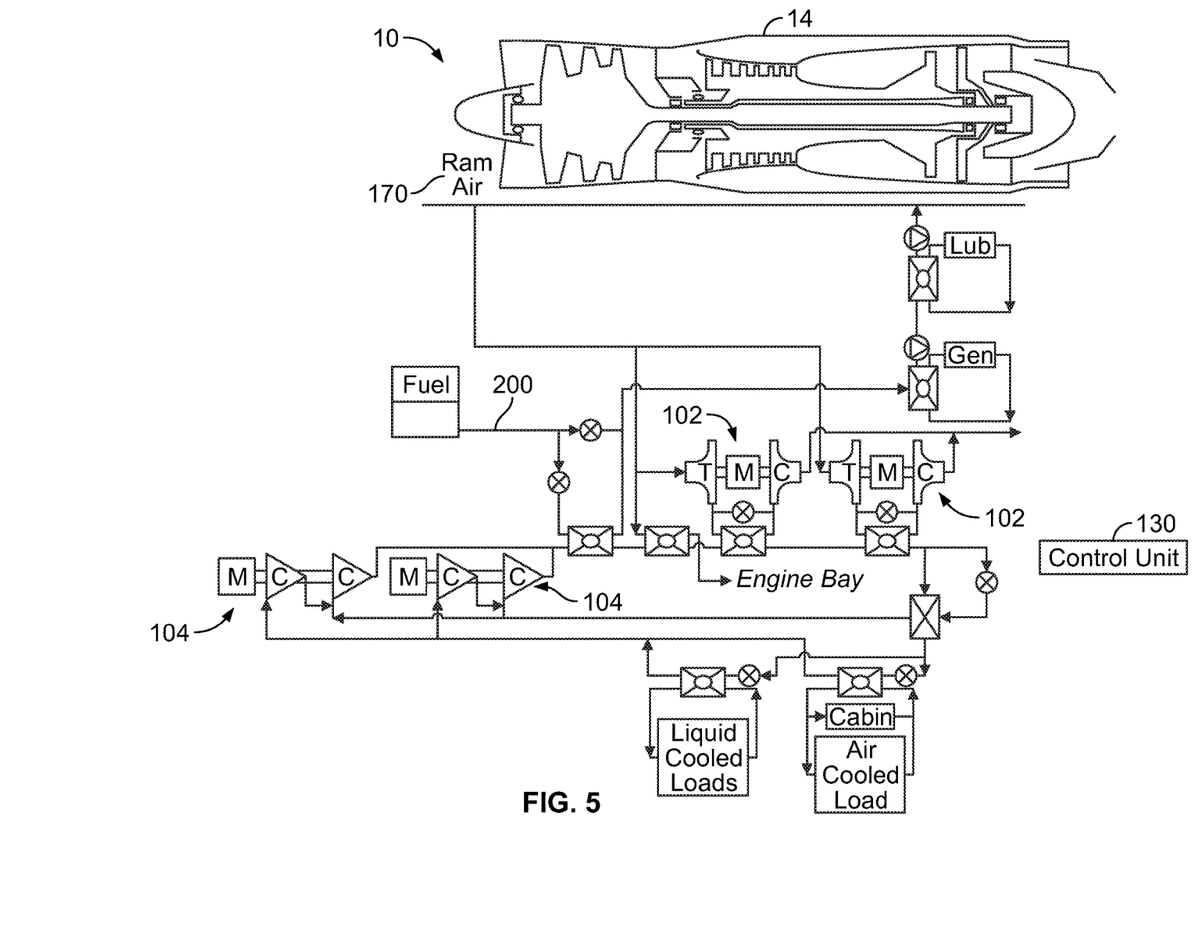
FIG. 5 illustrates a schematic view of a thermal management system, according to an embodiment of the present disclosure.

FIG. 5 illustrates a schematic view of the thermal management system 100, according to an embodiment of the present disclosure. The thermal management system 100 shown in FIG. 5 is similar to the thermal management system described with respect to FIG. 4, except that the thermal management system 100 may include two RACMs 102 and two VCS 104. The RACMs 102 are connected in parallel, while the VCS 104 are also connected in parallel. The multiple RACMs 102 and VCS 104 provide increased energy exchange with portions of the aircraft 10. The multiple RACMs 102 and VCS 104 provide increased and efficient conditioning of the portions of the aircraft 10 (such as the cabin and liquid and air cooled components of the aircraft 10) over a wide cooling load range. For example, the additional RACM 104 and the additional VCS 104 provide increased cooling capacity for the aircraft 10.

Alternatively, the thermal management system 100 may include more or less RACMs 102 and VCS 104 than shown. For example, the thermal management system may include three or more RACMs 102 and three or more VCS 104. In at least one other embodiment, the thermal management system 100 may include two or more RACMs 102 and one VCS 104. In at least one other embodiment, the thermal management system 100 may include two or more VCS 104 and one RACM 102.

Figure 6:
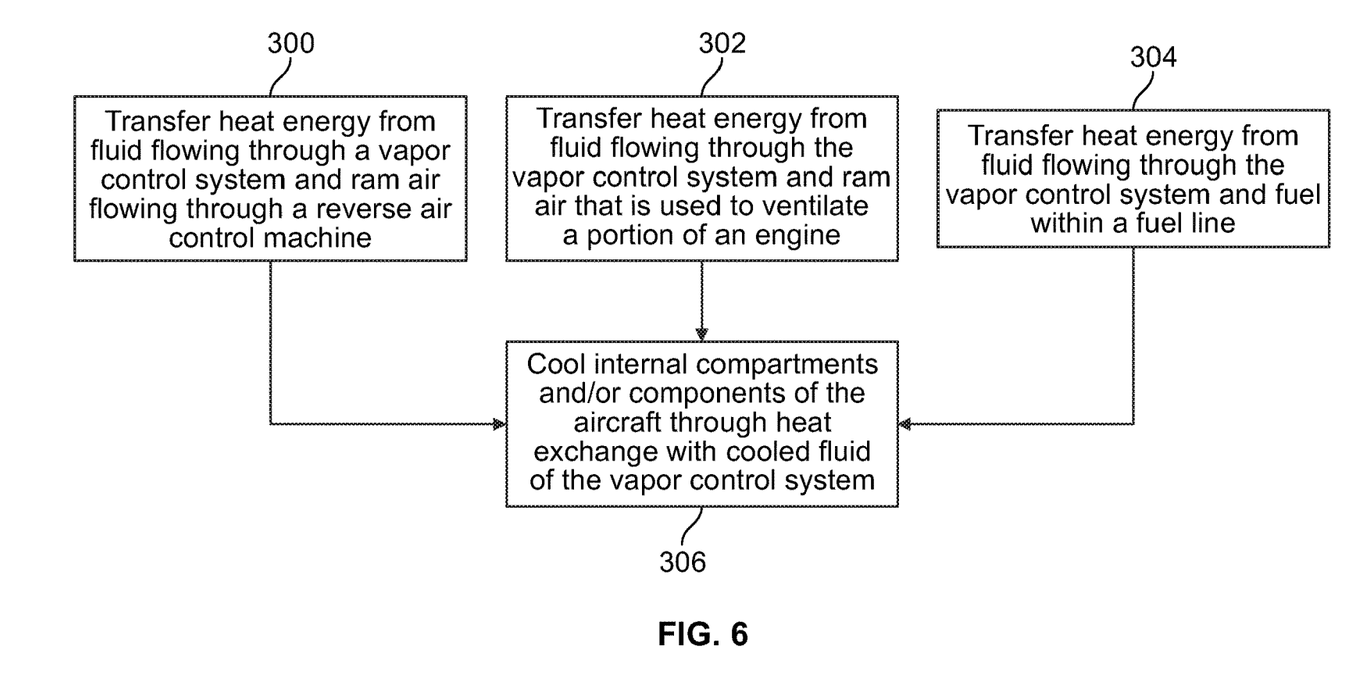
FIG. 6 illustrates a flow chart of a method of conditioning portions of a vehicle, according to an embodiment of the present disclosure.

FIG. 6 illustrates a flow chart of a method of conditioning portions of a vehicle, according to an embodiment of the present disclosure. The method begins at 300, in which heat energy is transferred from fluid flowing through a VCS and ram air that flows through a RACM. At 302, heat energy is transferred from fluid flowing the VCS and ram air that is used to ventilate a portion of an engine bay of the vehicle. At 304, heat energy is transferred from fluid flowing through the VCS and fuel within a fuel line that powers the engine. 300, 302, and 304 may occur in series or in parallel. The ram air that flows through the RACM, the ram air that is used to ventilate the engine bay, and the fuel within the fuel line each provide a separate and distinct heat sink that absorbs heat energy from the fluid within the VCS, thereby reducing the temperature of the fluid within the VCS, which may then absorb an increased amount of heat energy from various compartments and/or components of the aircraft through heat exchange. At 306, the internal compartments and/or components of the aircraft are cooled through heat exchange with the fluid of the VCS that has been cooled through the various heat sinks.

Alternatively, the method may not include 302. Also, alternatively, the method may not include 304.

Referring to FIGS. 1-6, embodiments of the present disclosure provide thermal management systems that are configured to efficiently cool compartments and/or components of a vehicle (such as an aircraft) through transferring heat energy from fluid (such as coolant) within at least one VCS to ram air, such as may be used to ventilate an engine, and/or which has passed through at least one RACM. The thermal management systems may also transfer heat energy from the fluid within the one or more VCS to fuel within a fuel line of the vehicle. The thermal management systems do not utilize bleed air. As such, the thermal management systems do not expend fuel compressing bleed air, which thereby allows the fuel to be used by the engine(s), and therefore increase the fuel range of the vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A thermal management system that is configured to cool portions of a vehicle, the thermal management system comprising:

at least one vapor control system (VCS) that is configured to cool the portions of the vehicle, wherein the at least one VCS circulates a refrigerant therethrough to cool the portions of the vehicle through heat exchange, wherein the at least one VCS comprises a VCS compressor that compresses the refrigerant;

at least one reverse air cycle machine (RACM) that couples to the at least one VCS through a first heat exchanger, wherein the at least one RACM is configured to receive ram air, wherein the at least one RACM expands the ram air, and wherein heat from the refrigerant circulating through the at least one VCS after being compressed by the VCS compressor is transferred to the ram air that is expanded through the first heat exchanger, wherein the at least one RACM comprises a RACM compressor and one or more RACM valves, the one or more RACM valves disposed within a heat transfer circuit that includes conduits connected to the first heat exchanger, wherein the RACM compressor compresses the ram air after the heat from the refrigerant is transferred to the ram air, and wherein the ram air is exhausted from the vehicle after the RACM compressor compresses the ram air, and a control unit operatively coupled to the one or more RACM valves, wherein the control unit selectively operates the one or more RACM valves to control a flow of the ram air through the heat transfer circuit and the first heat exchanger for regulating a temperature of the portions of the vehicle that are cooled by the at least one VCS.

2. The thermal management system of claim 1, wherein the at least one RACM comprises a turbine, wherein the ram air at least partially powers the turbine.

3. The thermal management system of claim 1, wherein the thermal management system refrains from utilizing bleed air from an engine of the vehicle.

4. The thermal management system of claim 1, further comprising a second heat exchanger that couples the at least one VCS to a ram air conduit that connects to a ram air inlet, wherein heat from the refrigerant circulating through the at least one VCS is also transferred to the ram air flowing through the ram air conduit through the second heat exchanger.

5. The thermal management system of claim 1, further comprising a second heat exchanger that couples the at least one VCS to a fuel line that connects a fuel tank to an engine of the vehicle, wherein heat from the refrigerant circulating through the at least one VCS is also transferred to fuel flowing through the fuel line through the second heat exchanger.

6. The thermal management system of claim 1, wherein the at least one VCS comprises at least two parallel VCS.

7. The thermal management system of claim 1, wherein the at least one RACM comprises at least two parallel RACMs.

8. The thermal management system of claim 1, wherein the at least one VCS comprises one or more VCS valves, and the control unit is configured to selectively operate the one or more VCS valves to control a flow of the refrigerant through the at least one VCS.

9. A thermal management method of cooling portions of a vehicle, the thermal management method comprising:
cooling the portions of the vehicle with at least one vapor control system (VCS), wherein the cooling operation comprises circulating a refrigerant through the at least one VCS to cool the portions of the vehicle through heat exchange and compressing the refrigerant using a compressor of the at least one VCS;
receiving ram air with at least one reverse air cycle machine (RACM) that couples to the at least one VCS through a first heat exchanger, the at least one RACM including a compressor and one or more RACM valves, the one or more RACM valves disposed within a heat transfer circuit that includes conduits connected to the first heat exchanger;
expanding the ram air with the at least one RACM;
controlling a flow of the ram air, that is expanded, through the heat transfer circuit by selectively operating, via a control unit, the one or more RACM valves to regulate a temperature of the portions of the vehicle cooled by the at least one VCS;
transferring heat from the refrigerant circulating through the at least one VCS to the ram air, that is expanded, through the first heat exchanger;
using the compressor of the at least one RACM to compress the ram air after the heat from the compressed refrigerant is transferred to the ram air; and
exhausting the ram air from the vehicle after the compressor of the at least one RACM compresses the ram air.

10. The thermal management method of claim 9, further comprising at least partially powering a turbine of the at least one RACM with the received ram air.

11. The thermal management method of claim 9, further comprising using a second heat exchanger to transfer heat from the compressed refrigerant circulating through the at least one VCS to ram air within a conduit that connects to a ram air inlet.

12. The thermal management method of claim 9, further comprising using a second heat exchanger to transfer heat from the compressed refrigerant circulating through the at least one VCS to fuel flowing through a fuel line.

13. The thermal management method of claim 9, further comprising:
controlling a flow of the refrigerant through the at least one VCS by selectively operating, via the control unit, one or more VCS valves.

14. An aircraft comprising:
a fuselage defining one or more internal compartments;
wings extending from the fuselage;
an empennage extending from the fuselage;
one or more engines secured to one or more of the wings, the fuselage, or the empennage;
a fuel line that connects a fuel tank to an engine of the aircraft;
one or more electronic sub-systems; and
a thermal management system that cools a cabin or a load of the aircraft without using bleed air from the one or more engines, the thermal management system comprising:
at least one vapor control system (VCS) that circulates a refrigerant therethrough to cool the cabin or the load of the aircraft through heat exchange, wherein the at least one VCS comprises a VCS compressor that compresses the refrigerant;
at least one reverse air cycle machine (RACM) that couples to the at least one VCS through a first heat exchanger, wherein the at least one RACM receives ram air generated by motion of the aircraft, wherein the at least one RACM comprises a turbine, a RACM compressor, and one or more RACM valves, the one or more RACM valves disposed within a heat transfer circuit that includes conduits connected to the first heat exchanger, wherein the turbine expands the ram air and is at least partially powered by the ram air, and wherein heat from the refrigerant circulating through the at least one VCS is transferred within the first heat exchanger to the ram air that is expanded, wherein the RACM compressor compresses the ram air after the heat from the refrigerant is transferred to the ram air, and wherein the ram air is exhausted from the aircraft after the RACM compressor compresses the ram air;
a second heat exchanger that couples the at least one VCS to a ram air conduit that connects to a ram air inlet, wherein heat from the refrigerant circulating through the at least one VCS is transferred within the second heat exchanger to the ram air flowing through the ram air conduit;
a third heat exchanger that couples the at least one VCS to the fuel line, wherein heat from the refrigerant circulating through the at least one VCS is transferred within the third heat exchanger to fuel flowing through the fuel line; and
a control unit operatively coupled to the one or more RACM valves and configured to selectively operate the one or more RACM valves to control a flow of the ram air through the heat transfer circuit and the first heat exchanger for regulating a temperature of the cabin or the load of the vehicle that is cooled by the at least one VCS.

15. The thermal management system of claim 14, wherein the at least one VCS comprises at least two parallel VCS, and wherein the at least one RACM comprises at least two parallel RACMs.

16. The thermal management system of claim 14, wherein the at least one VCS comprises one or more VCS valves configured to control a flow of the refrigerant through the at least one VCS, wherein the control unit is operatively coupled to the one or more VCS valves and selectively operates the one or more VCS valves.

17. The thermal management system of claim 1, further comprising a second heat exchanger along the at least one VCS downstream of the first heat exchanger and upstream of the VCS compressor, wherein the refrigerant circulating through the at least one VCS absorbs heat within the second heat exchanger from a fluid of a second heat transfer circuit that provides cooling for at least one of a cabin or a load of the vehicle.

18. The thermal management system of claim 1, wherein the VCS compressor is coupled to a motor that powers the VCS compressor.

19. The thermal management system of claim 1, wherein at least some of the refrigerant condenses from a vapor to a liquid within the first heat exchanger upon transferring heat to the ram air.

20. The thermal management system of claim 2, wherein the turbine and the RACM compressor are coupled to a common shaft and a motor is operatively connected to the turbine to selectively assist the ram air with powering the turbine.

* * * * *